US010765053B1

(12) United States Patent
Keigley

(10) Patent No.: US 10,765,053 B1
(45) Date of Patent: Sep. 8, 2020

(54) ARTICULATING PITCH-ADJUSTABLE HITCHES FOR SURFACE CONDITIONING TOOLS

(71) Applicant: ABI Attachments, Inc., Mishawaka, IN (US)

(72) Inventor: Kevin V. Keigley, Osceola, IN (US)

(73) Assignee: ABI ATTACHMENTS INC., Mishawaka, IN (US)

(*) Notice: Subject to any disclaimer, the term of this patent is extended or adjusted under 35 U.S.C. 154(b) by 83 days.

(21) Appl. No.: 16/131,449

(22) Filed: Sep. 14, 2018

(51) Int. Cl.
*A01B 59/06* (2006.01)
*A01B 59/00* (2006.01)
*A01B 31/00* (2006.01)

(52) U.S. Cl.
CPC .......... *A01B 59/066* (2013.01); *A01B 31/00* (2013.01); *A01B 59/004* (2013.01)

(58) Field of Classification Search
CPC .......... A01B 9/004; A01B 9/066; A01B 31/00
USPC ........................................ 172/281, 324, 605
See application file for complete search history.

(56) References Cited

U.S. PATENT DOCUMENTS

| | | | |
|---|---|---|---|
| 1,674,306 A | 6/1928 | Shaw | |
| 1,865,812 A | 7/1932 | Anderson | |
| 2,560,711 A | 7/1951 | Arps | |
| 2,642,294 A * | 6/1953 | Holm | E01H 5/06 280/460.1 |
| 2,762,138 A * | 9/1956 | Beam | E02F 5/02 37/366 |
| 2,888,997 A * | 6/1959 | Fraga | A01B 59/066 172/448 |
| 2,960,346 A * | 11/1960 | Hunter | A01B 63/22 280/43.19 |
| 3,069,792 A | 12/1962 | Ryals | |
| 3,525,201 A * | 8/1970 | Kaufman | A01D 34/42 56/7 |
| 3,613,802 A | 10/1971 | Carlson | |
| 3,666,020 A | 5/1972 | Hess | |
| 3,739,860 A | 6/1973 | Rogers | |
| 3,808,739 A | 5/1974 | Newgent | |
| 3,823,781 A | 7/1974 | Check et al. | |
| 4,561,797 A * | 12/1985 | Aldridge | A01D 75/30 172/314 |

(Continued)

*Primary Examiner* — Tara Mayo-Pinnock
(74) *Attorney, Agent, or Firm* — Taft Stettinius & Hollister LLP

(57) ABSTRACT

One exemplary embodiment is a hitch assembly including forward and rearward lateral members, first and second longitudinal members and a lifting member which are coupled together to form a laterally-articulating pitch-adjustable quadrilateral. The forward lateral member is coupled with the first longitudinal member by a first joint and the second longitudinal member by a second joint. The rearward lateral member is coupled with the first longitudinal member by a third joint and the second longitudinal member by a fourth joint. The lifting member is coupled with the rearward lateral member by a first flexible rigging member and a second flexible rigging member. The quadrilateral can articulate between a left-leaning configuration, a rectangular configuration, and a right-leaning configuration. The lifting member can be adjusted to vary an amount of slack in one or both of the flexible rigging members and to raise and lower the rearward lateral member.

20 Claims, 13 Drawing Sheets

(56) References Cited

U.S. PATENT DOCUMENTS

| | | | |
|---|---|---|---|
| 4,583,307 A | | 4/1986 | Lenert |
| 4,651,450 A | | 3/1987 | York et al. |
| 4,651,451 A | | 3/1987 | Beeley et al. |
| 4,805,322 A | * | 2/1989 | Lemire et al. .......... E02F 3/627 172/445.1 |
| 4,840,233 A | * | 6/1989 | Friggstad et al. ..... A01B 51/00 172/311 |
| 4,989,676 A | | 2/1991 | Rogers |
| 5,465,510 A | | 11/1995 | Goodnough et al. |
| 5,497,569 A | | 3/1996 | Byman |
| 5,890,545 A | | 4/1999 | Smith et al. |
| 6,209,231 B1 | * | 4/2001 | Curtis ....................... E01H 5/06 37/231 |
| 7,464,528 B1 | | 12/2008 | Street et al. |
| 9,545,050 B2 | | 1/2017 | Fichera |
| 2014/0262387 A1 | | 9/2014 | Schmidt et al. |

* cited by examiner

ARTICULATING PITCH-ADJUSTABLE HITCHES FOR SURFACE CONDITIONING TOOLS

BACKGROUND

The present disclosure relates generally to articulating pitch-adjustable hitches for surface conditioning tools. More particularly, but not exclusively, the present disclosure relates to articulating pitch-adjustable hitches for coupling surface conditioning tools with work machines in a tow behind configuration. A number of hitches have been proposed for surface conditioning tools for maintaining playing surfaces such as a baseball infield and warning track surfaces and other athletic fields as well as landscaping and grading applications. Heretofore, such hitches have suffered from a number of drawbacks and disadvantages. There remains a substantial need for the unique apparatuses, systems, and methods disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique articulating pitch-adjustable tool. Another embodiment is a unique system including an articulating pitch-adjustable tool. A further embodiment is a unique method of operating an articulating pitch-adjustable tool. Other embodiments, forms, objects, features, advantages, aspects, and benefits shall become apparent from the following description and drawings.

DETAILED DESCRIPTION OF ILLUSTRATIVE EMBODIMENTS

Figure 1:
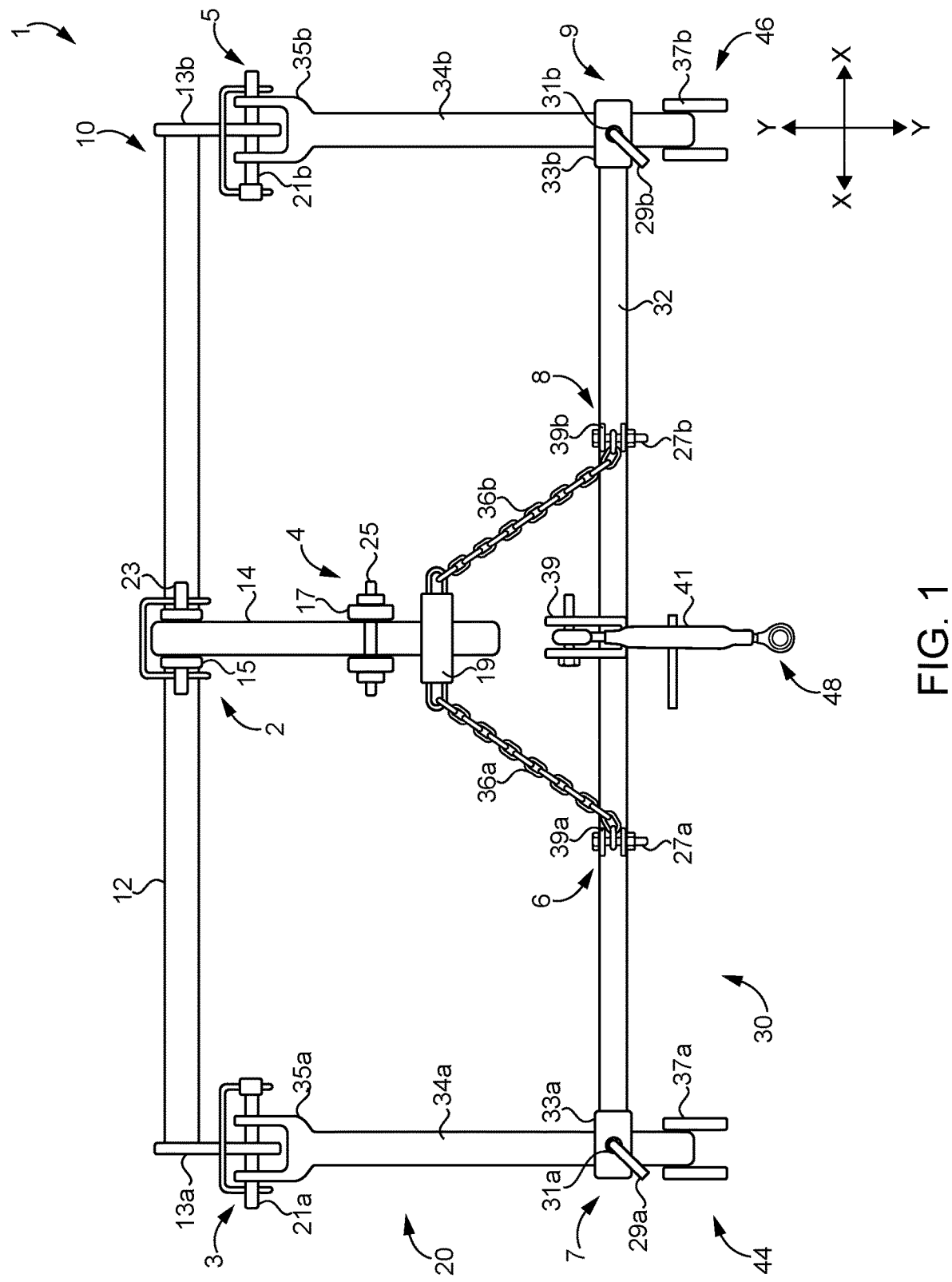
FIG. 1 is a top view of an exemplary articulating pitch-adjustable hitch.

With reference to FIG. 1, there is illustrated a top view of an exemplary articulating pitch-adjustable hitch assembly 1 which is configured to and operable to couple a surface conditioning tool with a work machine. Articulating pitch-adjustable hitch assembly 1 may also be referred to herein as hitch assembly 1 or hitch 1. Hitch assembly 1 includes a forward section 10, a middle section 20 and a rearward section 30 which are coupled together to form a laterally-articulating pitch-adjustable frame. In certain embodiments, the laterally-articulating pitch-adjustable frame may be configured as a quadrilateral. For example, in the illustrated embodiment, the laterally-articulating pitch-adjustable frame is configured as a parallelogram. Other embodiments comprise different types of quadrilateral frame configurations. Further embodiments comprise other types of frames having a non-quadrilateral shape such as higher order or lower order polygonal shapes including points of articulation adapted to provide a laterally-articulating pitch-adjustable frame.

Forward section 10 includes a forward lateral member 12 extending along a width of the hitch assembly 1 which is the X-axis direction in the illustrated embodiment. In certain embodiments, forward lateral member 12 may be provided as an integral component of a work machine, for example, forward lateral member 12 may be welded, clamped, fastened or otherwise coupled with other structures of a work machine in a manner which is not readily reversible absent cutting or other deconstruction or disassembly of the work machine. In other embodiments forward lateral member 12 may be provided as a modular component configured to be reversibly coupled and decoupled from one or more structures of a work machine, for example, using fasteners, insertion slots or channels or other readily reversible or selectable coupling and decoupling mechanisms.

Figure 11:
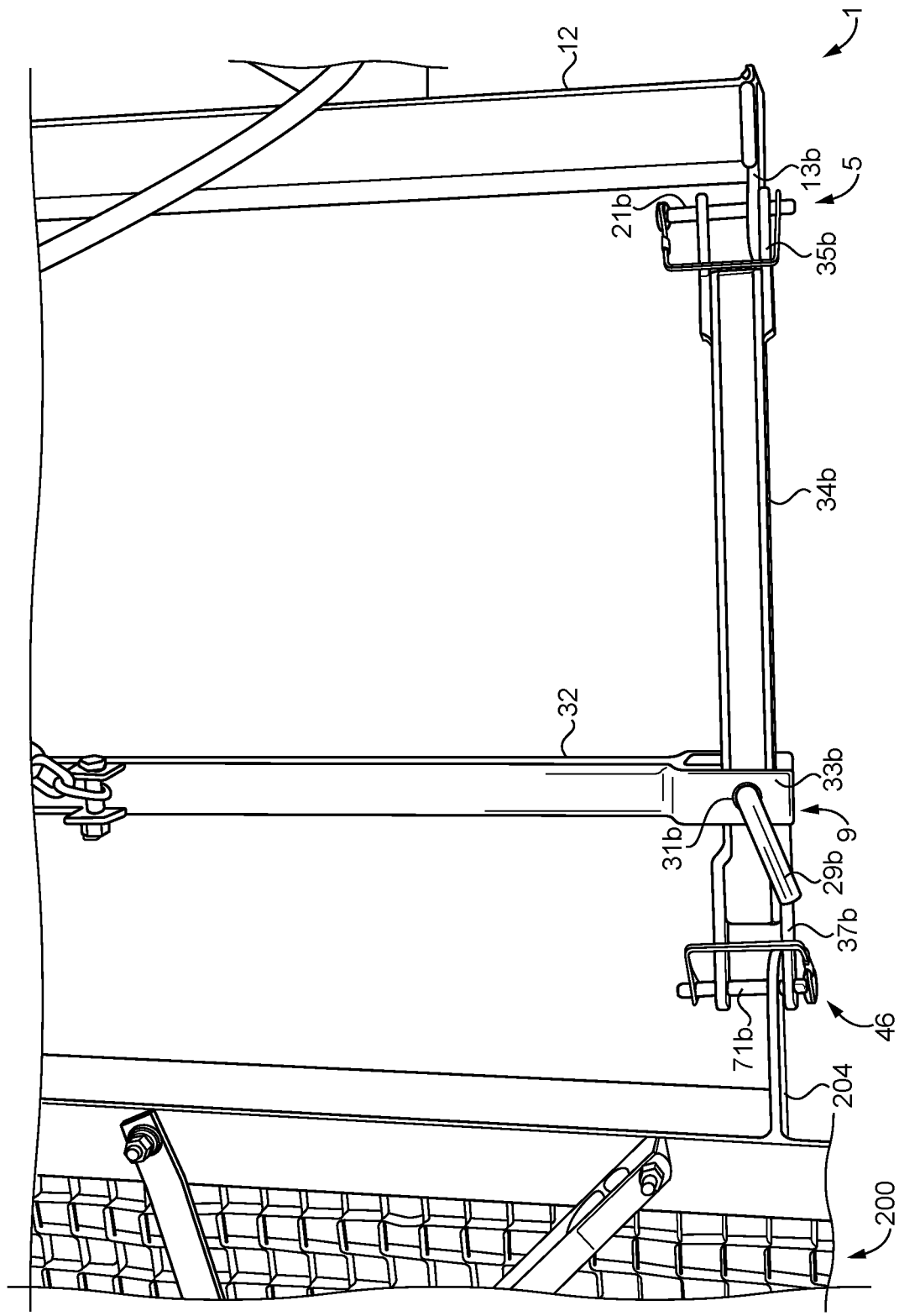
FIGS. 11, 12*a* and 13*a* depict top views of several portions of the exemplary articulating pitch-adjustable hitch of FIG. 1.

Forward section 10 further includes forward section joint member 13*a* and forward section joint member 13*b* which is spaced apart from forward section joint member 13*a* along the width of the hitch assembly 1. In the illustrated embodiment, forward section joint members 13*a* and 13*b* comprise male members of play-added clevis-type joints (sometimes referred to as play-added knuckle joints) which are also illustrated in further detail in FIG. 11-13. In other embodiments, forward section joint members 13*a* and 13*b* may comprise other types of joint members, for example, female members of play-added clevis-type joints, or members of revolute joints, ball or socket members of ball and socket joints, and various other joints that provide at least a first freedom of motion in the Y-Z plane and a second freedom of motion in the X-Y plane of the illustrated X-Y-Z coordinate system.

As described and illustrated herein, play-added clevis-type joints are configured to provide at least a first freedom of motion in the Y-Z plane and a second freedom of motion in the X-Y plane of the illustrated X-Y-Z coordinate system. In the illustrated embodiment, the first freedom of motion is exercised when longitudinal members 34*a* and 34*b* rotate about pin member 21a in the Y-Z plane relative to forward lateral member 12. Such a first freedom of motion is provided by clevis-type joints generally regardless of whether or not such joints are of a play-added type.

The second freedom of motion adds play to the clevis-type joint and is exercised when longitudinal members 34a and 34b rotate or sway in the X-Y plane relative to pin member 21a and forward lateral member 12. Such second freedom of motion may be provided by a slot formed in a member of a clevis-type joint, such as forward section joint members 13a and 13b, which receives a pin, such as coupling pin members 21a and 21b. The dimensions of such play-added slots are selected to provide the second freedom of motion in addition to and generally perpendicular to the first freedom of motion. For example, as best illustrated in FIG. 12a forward section joint members 13b includes an oblong slot 61b which extend in a major dimension in the Y-axis direction plane and in a minor dimension in the Z-axis direction and which receive coupling pin members 21b. While not separately depicted, forward section joint member 13a includes as substantially similar slot and pin arrangement. The dimensions of oblong slots provided in forward section joint members 13a and 13b are selected to provide the second freedom of motion in addition and generally perpendicular to the first freedom of motion. As a further example, as best illustrated in FIG. 13a tool joint member 204 includes an oblong slot 66b which extend in a major dimension in the Y-axis direction plane and in a minor dimension in the Z-axis direction and which receive coupling pin members 71b. While not separately depicted, tool joint member 202 includes as substantially similar slot and pin arrangement. The dimensions of oblong slots provided in tool joint members 202 and 204 are selected to provide a second freedom of motion in addition and generally perpendicular to their first freedom of motion.

Rearward section 30 includes a rearward lateral member 32 extending along the width of the hitch assembly 1. Rearward section joint members 33a and 33b are coupled with the rearward lateral member 32 and are spaced apart from one another along the width of the hitch assembly 1. Rearward section joint members 33a and 33b are respectively coupled with rearward middle section joint member 31a and 31b by coupling pin members 29a and 29b to provide joints 7 and 9. In the illustrated embodiment, joints 7 and 9 comprise clevis-type joints, rearward section joint members 33a and 33b comprise female members of clevis-type joints, and rearward middle section joint member 31a and 31b comprise male members of clevis-type joints. In other embodiments, joints 7 and 9 and may comprise other types of joint members, for example, clevis-type joints with an opposite male-female relationship between rearward section joint members 33a and 33b and rearward middle section joint member 31a and 31b, revolute joints, ball or socket members of ball and socket joints and various other joints that provide at least freedom of motion in the in the X-Y plane, such as may occur when longitudinal member 34a moves relative to rearward lateral member 32 in the X-Y plane of the illustrated X-Y-Z coordinate system.

Middle section 20 includes longitudinal members 34a and 34b and a lifting member 14. Longitudinal member 34a includes middle section joint member 35a which is coupled with forward section joint member 13a by a pin member 21a to form a joint 3 which couples longitudinal member 34a and forward lateral member 12. Longitudinal member 34b includes middle section joint member 35b which is coupled with forward section joint member 13b by a pin member 21b to form joint 5 which couples the second longitudinal member 34b and the forward lateral member 12. In the illustrated embodiment, longitudinal members 34a and 34b are provided at the lateral extremities of hitch assembly 1. In other embodiments, longitudinal members 34a and 34b may be provided at locations further laterally inward relative to the illustrated embodiment.

In the illustrated embodiment, joints 3 and 5 comprise play-added clevis-type joints which permit middle section joint member 35a and forward section joint member 13a to rotate relative to one another about pin member 21a in the Y-Z plane, and also permit middle section joint member 35a and forward section joint member 13a to move relative to one another in the X-Y plane. In the illustrated embodiment, the play-added characteristic of joints 3 and 5 permitting motion in the X-Y plane is attributable to the dimensions of one or both of the apertures in forward section joint members 13a and 13b and middle sections joint members 35a and 35b which receive pin members 21a or 21b and permit a degree of motion in the X-Y plane. In certain preferred forms the motion in the X-Y plane may be at least +/−15 degrees of motion between forward lateral member 12 and longitudinal members 34a and 34b. In certain preferred forms the motion in the X-Y plane may be at least +/−25 degrees of motion between forward lateral member 12 and longitudinal members 34a and 34b. In certain preferred forms the motion in the X-Y plane may be at least +/−30 degrees of motion between forward lateral member 12 and longitudinal members 34a and 34b.

Longitudinal member 34a includes rearward middle section joint member 31a which is spaced apart from middle section joint member 35a along the length of the hitch assembly 1 and is coupled with rearward section joint member 33a to form a joint 7 which couples longitudinal member 34a and rearward lateral member 32. Longitudinal member 34b includes middle section joint member 33b which is spaced apart from middle section joint member 35b along the length of the hitch assembly 1 and is coupled with rearward section joint member 31b to form a joint 9 coupling longitudinal member 34b and rearward lateral member 32.

Lifting member 14 is rotatably coupled with forward lateral member 12 at a location intermediate forward section joint members 13a and 13b by a third forward section joint member 15 and a pin member 23 which form a fifth joint 2 coupling the lifting member 14. Flexible rigging member 36a is coupled with and extends between coupling 19 of lifting member 14 and joint 6 of rearward lateral member 32 which is formed by bracket 39a and fastener 27a. Flexible rigging member 36b is coupled with and extends between coupling 19 of lifting member 14 and coupling 8 of rearward lateral member 32 which is formed by bracket 39b and fastener 27b. In the illustrated embodiment, flexible rigging members 36a and 36b comprise lengths of chain. In other embodiments, flexible rigging members 36a and 36b may comprise cables, lines, ropes, wires or other types of flexible rigging members. Lifting joint member 17 and pin member 25 form a sixth joint 4 which can be used to couple an actuator with the lifting member 14.

Hitch assembly 1 includes a three-point connection for a surface conditioning tool. In the illustrated embodiment, the three-point connection includes rearward joint members 37a and 37b which are coupled with and extend from rearward portions of longitudinal member 34a and longitudinal member 34b, respectively. In the illustrated embodiment, rearward joint members 37a and 37b comprise female members of play-added clevis-type joints 44 and 46, respectively, which are structured to couple with male members of play-added clevis-type joints 44 and 46 that are coupled with a surface conditioning tool. The three-point connection further includes a joint member 39. In the illustrated form, joint member 39 is depicted as a female member of a clevis-type joint which is rotatably coupled with a male member of a clevis-type joint provided at one end of top link 41. Top link 41 also includes another male member of a clevis-type joint 48 at its opposite end. It shall be appreciated that top link 41 is one example of a variable-length tool coupling member. In other embodiments, a variable-length tool coupling joint member may be provided in other forms, for example, an electrically or hydraulically actuated link. In other embodiments, a fixed-length tool coupling member may be used in place of top link 41 or other variable-length tool coupling members.

It shall be appreciated that a variable-length tool coupling member (e.g., top link 41) or a fixed length tool coupling member may be provided as a component of hitch assembly 1, may be provided as a component of a tool with which hitch assembly 1 can be coupled, or may be provided as a stand-alone component. In some applications, it may be preferred to provide a separate dedicated variable-length or fixed length tool coupling member for each of a plurality of tools. Providing separate dedicated tool coupling members may facilitate the ease with which different tools may be swapped out from hitch assembly 1 by mitigating or eliminating the need for readjustment of the tool coupling member to accommodate different types of tools.

Figure 2:
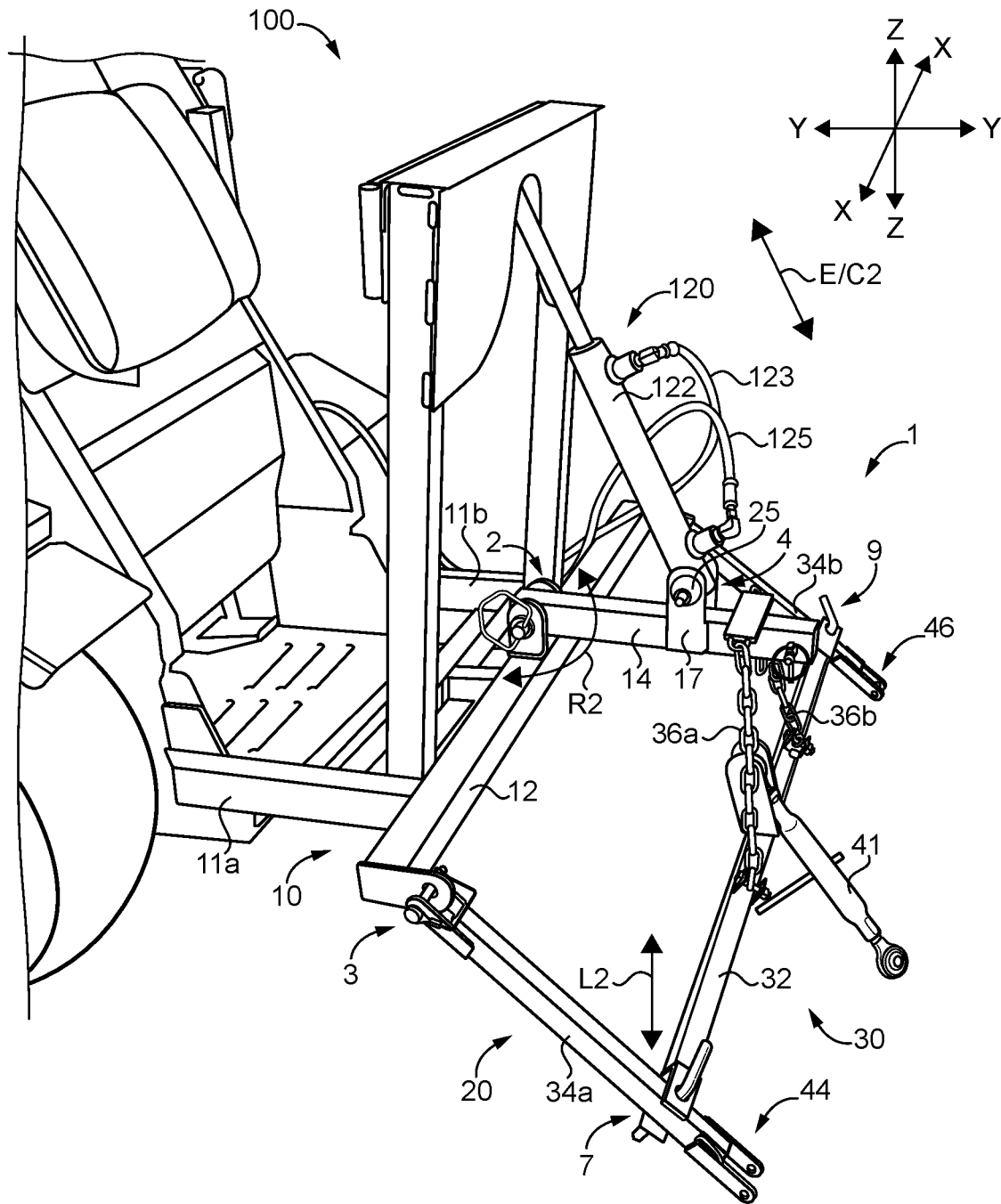
FIG. 2 is a perspective view of the exemplary articulating pitch-adjustable hitch of FIG. 1 coupled with an exemplary work machine.

With reference to FIG. 2, there is illustrated a perspective view of an exemplary assembly of articulating pitch-adjustable hitch 1 coupled with exemplary work machine 100. In the illustrated embodiment, forward lateral member 12 is provided as an integral component of work machine 100 and is welded with frame members 11a and 11b of work machine 100. As noted above, in other embodiments, forward lateral member 12 may be, clamped, fastened or otherwise coupled with various structures of work machine 100 and may be provided as a modular component configured to be reversibly coupled and decoupled from one or more structures of a work machine, for example, using fasteners, insertion slots or channels or other reversible or selectable coupling and decoupling mechanisms.

In the illustrated embodiment, work machine 100 is a zero turn radius work machine of the types described in U.S. Pat. Nos. 9,332,687 and 9,883,621 the disclosure of which is incorporated herein by reference. In other embodiments, various other types of work machines may be utilized, such as other types of zero turn radius work machine, a riding lawnmower, a lawn tractor, and ATV or a variety of other types of work machines capable of towing a work tool.

Work machine 100 includes an actuator 120 which is coupled with lifting joint member 17 and pin member 25 to form a joint 4 which couples lifting member 14 and actuator 120. In the illustrated embodiment, actuator 120 is configured as a hydraulic cylinder 122 which is adjustable and actuatable by selectably supplying pressurized hydraulic fluid from hydraulic supply line 123 or 125 to respectively expand or contract the length of the hydraulic cylinder 122 as indicated by arrow E/C2. Such adjustment of actuator 120 causes the lifting member 14 to rotate about joint 2 in the direction indicated by arrow R2. Starting from a lowermost position of lifting member 14, such rotation is first effective to reduce slack in flexible rigging members 36a and 36b. Once flexible rigging members 36a and 36b become taut, such rotation is effective to cause a corresponding rotation of longitudinal members 34a and 34b and to raise and lower rearward lateral member 32 in the direction generally indicated by arrow L2.

With reference to FIGS. 3-9, there are illustrated several perspective views of articulating pitch-adjustable hitch 1 coupled with work machine 100 and an exemplary surface conditioning tool 200 in several different states of adjustment. In the illustrated embodiment, rearward joint members 37a and 37b of articulating pitch-adjustable hitch 1 are coupled with tool joint members 202 and 204 of surface conditioning tool 200, respectively, to provide play-added clevis-type joints 44 and 46. Top link 41 is further coupled with tool joint member 206.

Surface conditioning tool 200 may be any of a variety of surface conditioning drag tools which are configured to be coupled with and towed behind a work machine, such as work machine 100. For example, surface conditioning tool 200 may comprise various brooms, brushes, nail drags, flexible drag mats or other types of surface conditioning or grooming drags such as other types of baseball infield grooming drag tools, cocoa mats, chain drags, chain harrows, equine drags, bunker rakes, segmented cone drags, and combinations thereof.

Articulating pitch-adjustable hitch 1 is capable of active adjustment, passive adjustment and combined active/passive adjustment. In the illustrated embodiment, active adjustment may be accomplished by operating actuator 120 to raise and lower lifting member 14 and passive adjustment may be accomplished in response to the turning of work machine 100.

Figure 3:
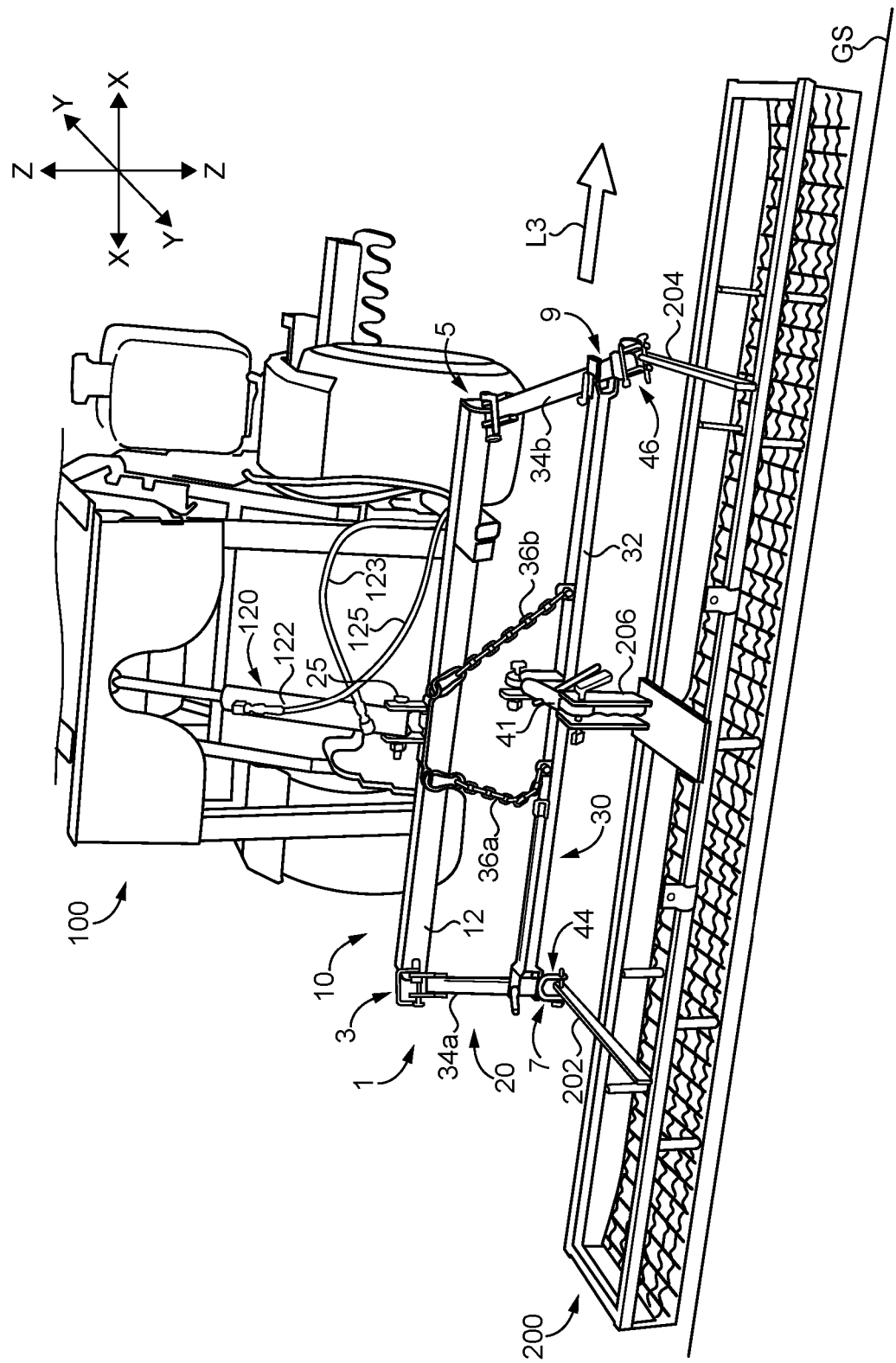
FIGS. 3-9 depict several perspective views of the exemplary articulating pitch-adjustable hitch of FIG. 1 coupled with an exemplary work machine and an exemplary surface conditioning tool in several different states of adjustment.

In the state of adjustment illustrated in FIG. 3, the actuator 120 has been extended to lower lifting member 14 such that surface conditioning tool 200 is substantially parallel to and rests upon the underlying ground surface GS. At the same time work machine 100 has performed a turn in response to which articulating pitch-adjustable hitch 1 has conformed to a left-leaning configuration in which longitudinal members 34a and 34b are positioned at left-leaning angles through articulation at joints 3, 5, 6 and 9, and rearward lateral member 32 is offset from forward lateral member 12 in the direction indicated by arrow L3. This passive articulation motion has reached its maximum which is constrained by flexible rigging member 36b which is taut and limits further left-leaning articulation. Articulation at joints 44 and 46 has allowed surface conditioning tool 200 to avoid the degree of angular lean experienced by longitudinal members 34a and 34b and to maintain a relatively more constant angle or, in some forms, a constant angle relative to forward lateral member 12 and rearward lateral member 32.

Figure 4:
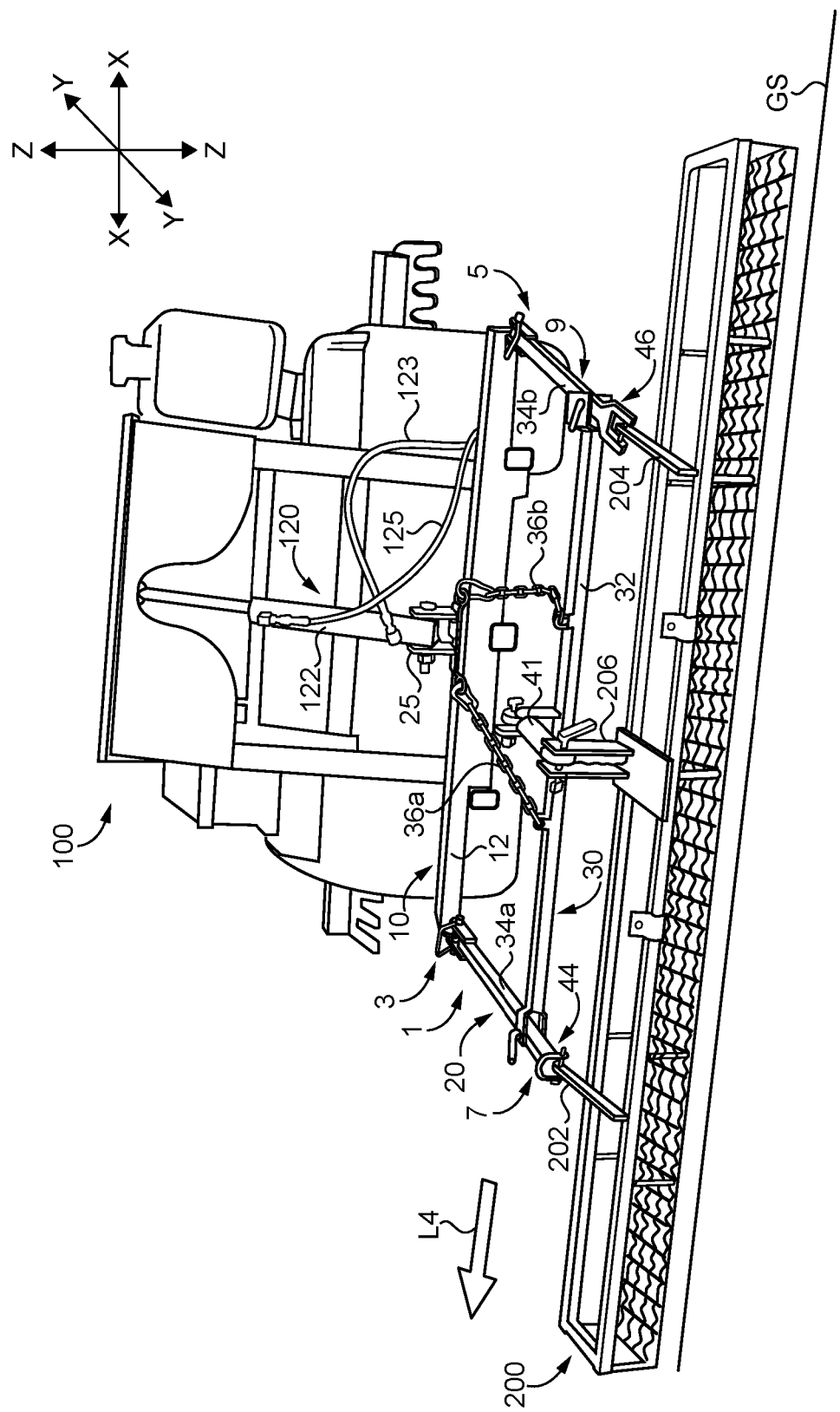

In the state of adjustment illustrated in FIG. 4, the actuator 120 has been extended to lower lifting member 14 such that surface conditioning tool 200 is substantially parallel to and rests upon the underlying ground surface GS. At the same time work machine 100 has performed a turn in response to which articulating pitch-adjustable hitch 1 has conformed to a right-leaning configuration in which longitudinal members 34a and 34b are positioned at right-leaning angles through articulation at joints 3, 5, 6 and 9, and rearward lateral member 32 is offset from forward lateral member 12 in the direction indicated by arrow L4. This passive articulation motion has reached its maximum which is constrained by flexible rigging member 36a which is taut and limits further right-leaning articulation. Articulation at joints 44 and 46 has allowed surface conditioning tool 200 to avoid the degree of angular lean experienced by longitudinal members 34a and 34b and to maintain a relatively more constant angle or, in some forms, a constant angle relative to forward lateral member 12 and rearward lateral member 32.

Figure 5:
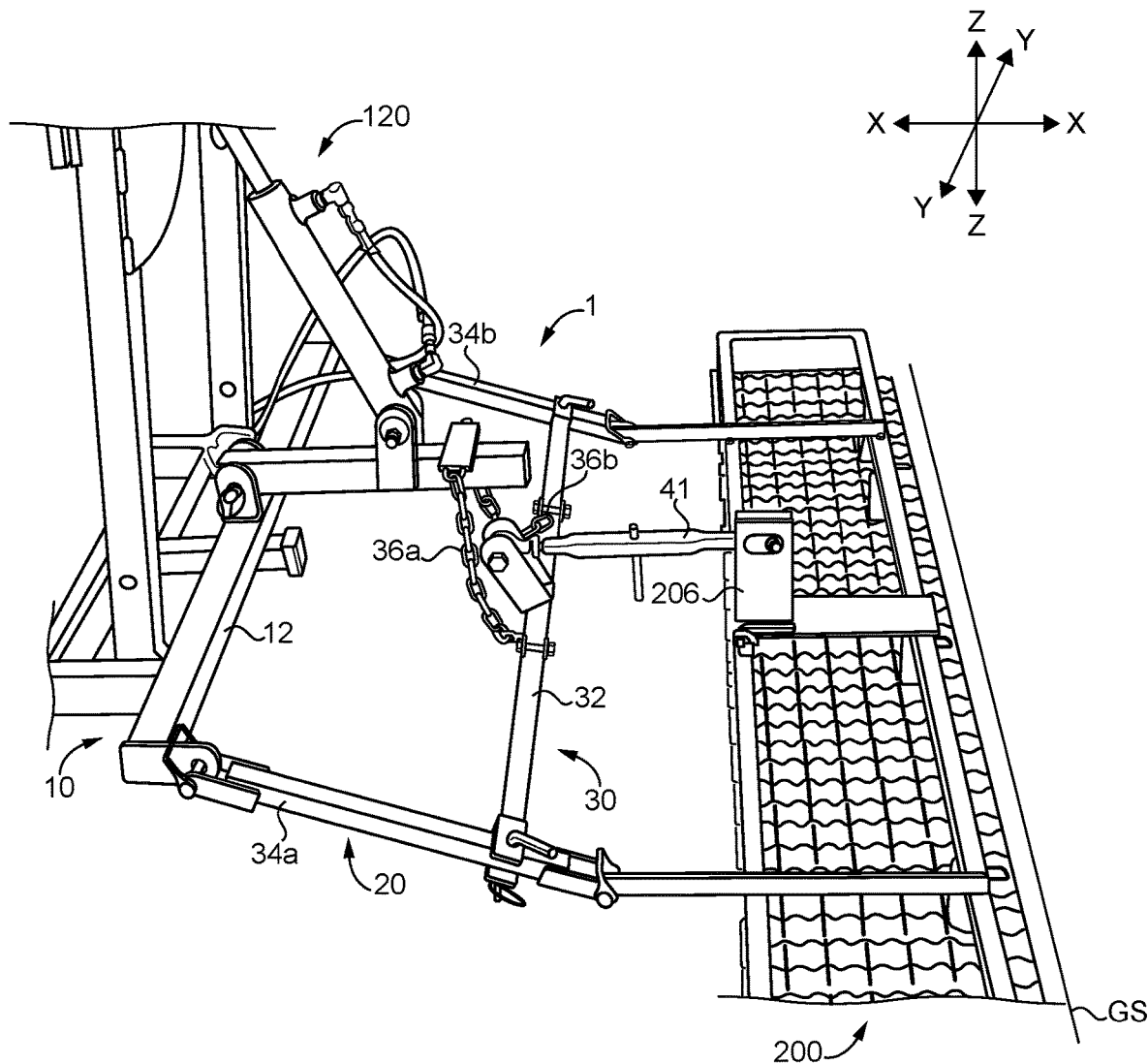
Figure 6:
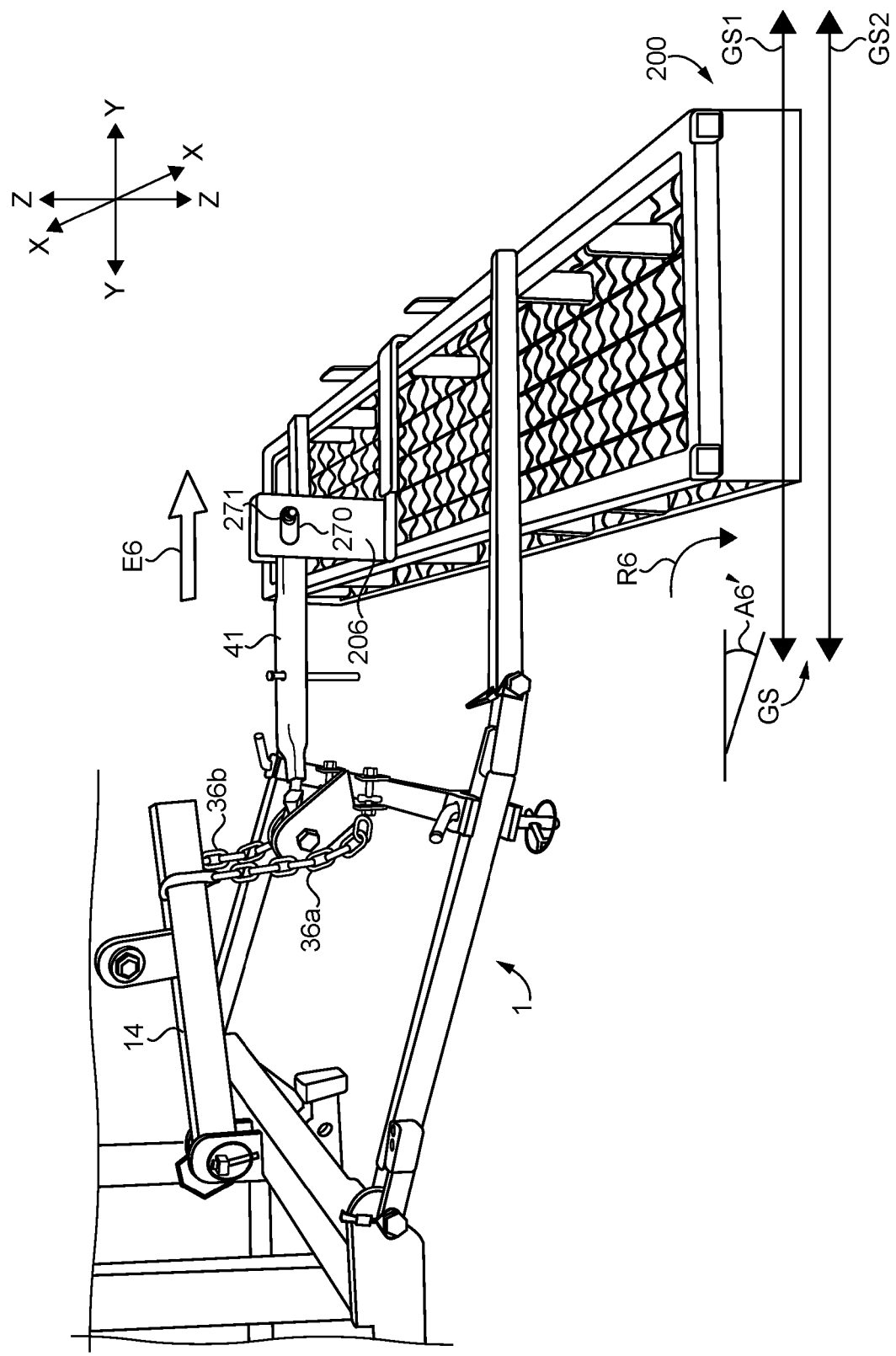

In the state of adjustment illustrated in FIGS. 5 and 6, the actuator 120 has been extended to lower lifting member 14 such that surface conditioning tool 200 is substantially parallel to and contacts the underlying ground surface GS. At the same time work machine 100 has advanced in a straight line in response to which articulating pitch-adjustable hitch 1 has conformed to non-leaning configuration in which longitudinal members 34a and 34b have confirmed to a position substantially perpendicular to forward lateral member 12 and rearward lateral member 13 through articulation at joints 3, 5, 6 and 9, and rearward lateral member 32 is substantially aligned with forward lateral member 12. This configuration allows passive articulation either to the left or to the right provided by slack which is present in flexible rigging members 36a and 36b.

It shall be appreciated that in the illustrated embodiment underlying ground surface GS includes a compacted subsurface GS2 and a top layer of material GS1 which is less compacted than subsurface GS2. Such conditions may be present in a number of work scenarios, for example, in baseball diamonds or other athletic fields as well as in certain grading or landscaping environments. It shall be further appreciated that illustrated ground surface characteristics are exemplary and that the embodiments disclosed herein may be utilized in connection with a variety of ground surfaces having differing characteristics.

As illustrated in FIG. 6, surface conditioning tool 200 is substantially parallel with underlying ground surface GS. From this state, top link 41 may be extended in the direction indicated by arrow E6 to cause pin 271 to apply force to the rear end of slot 270 thereby causing surface conditioning tool 200 to rotate in the direction indicated by arrow R6 to achieve a non-parallel pitch relative to the ground surface GS as generally indicated by angle A6'. Such downward rotation tends to increase the force applied to and/or working depth of the rear of the surface conditioning tool 200 whose overall weight is substantially unsupported by articulating pitch-adjustable hitch 1.

It shall be appreciated that top link 41 may also be adjusted in a direction opposite that indicated by arrow E6 to cause pin 271 to apply force to the front end of slot 270 thereby causing surface conditioning tool 200 to rotate downward in a direction opposite that indicated by arrow R6 to achieve a non-parallel pitch relative to the ground surface GS in the direction substantially opposite to that indicated by angle A6'. Such downward rotation tends to increase the force applied to and/or working depth of the front of the surface conditioning tool 200 whose overall weight is substantially unsupported by articulating pitch-adjustable hitch 1.

It shall be further appreciated that, in some embodiments, articulating pitch-adjustable hitch 1 may be coupled with s surface conditioning drag tools which utilize a connection member in which a non-translating coupling (e.g., a round aperture) is utilized instead of slot 270. In such embodiments, the pitch variation permitted by slot 270 is not present, although pitch adjustability may still be provided, for example, by use of a top link. Examples of tools for which this may be suitable include brooms and nail drags.

Figure 7:
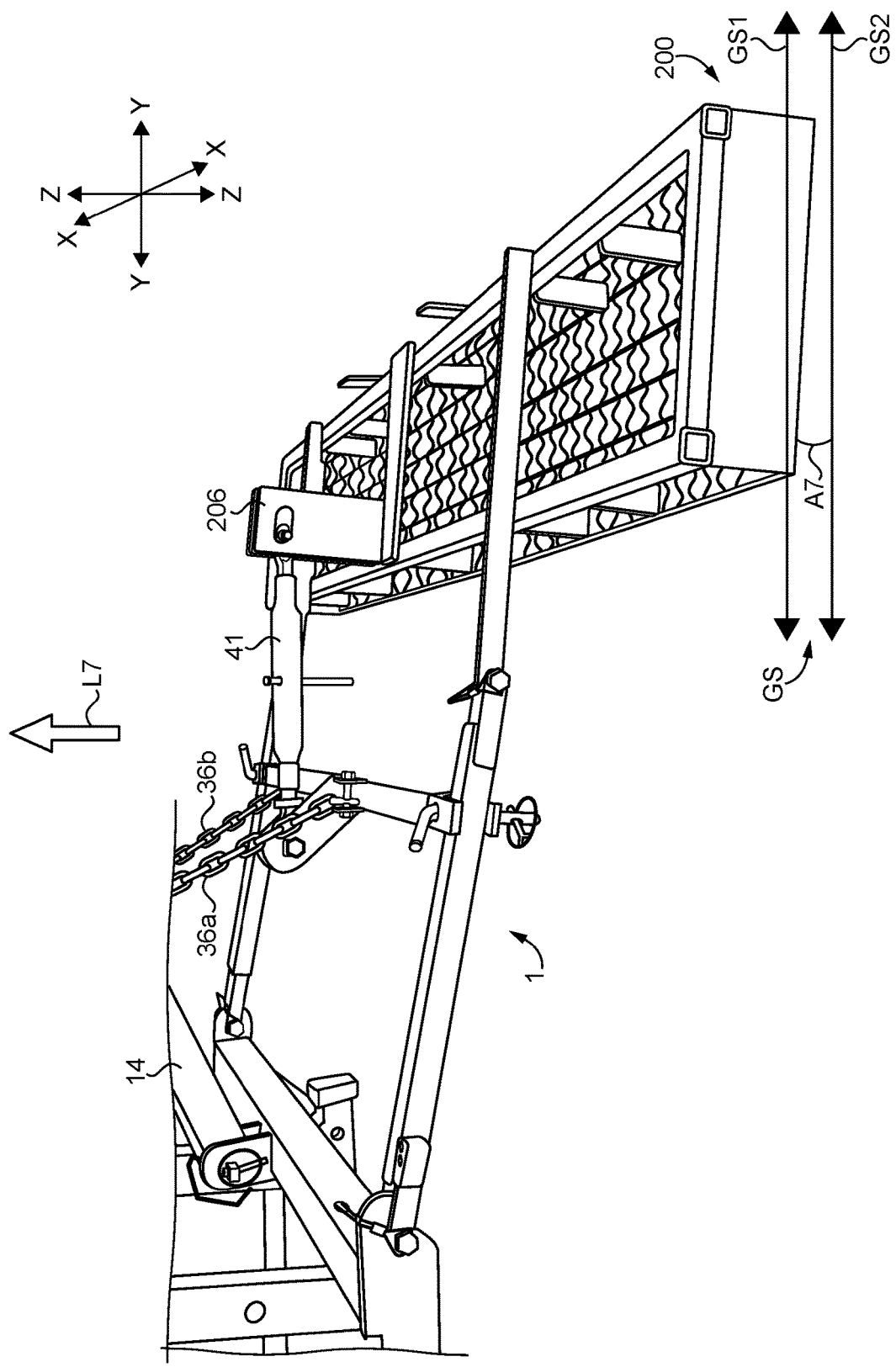
Figure 8:
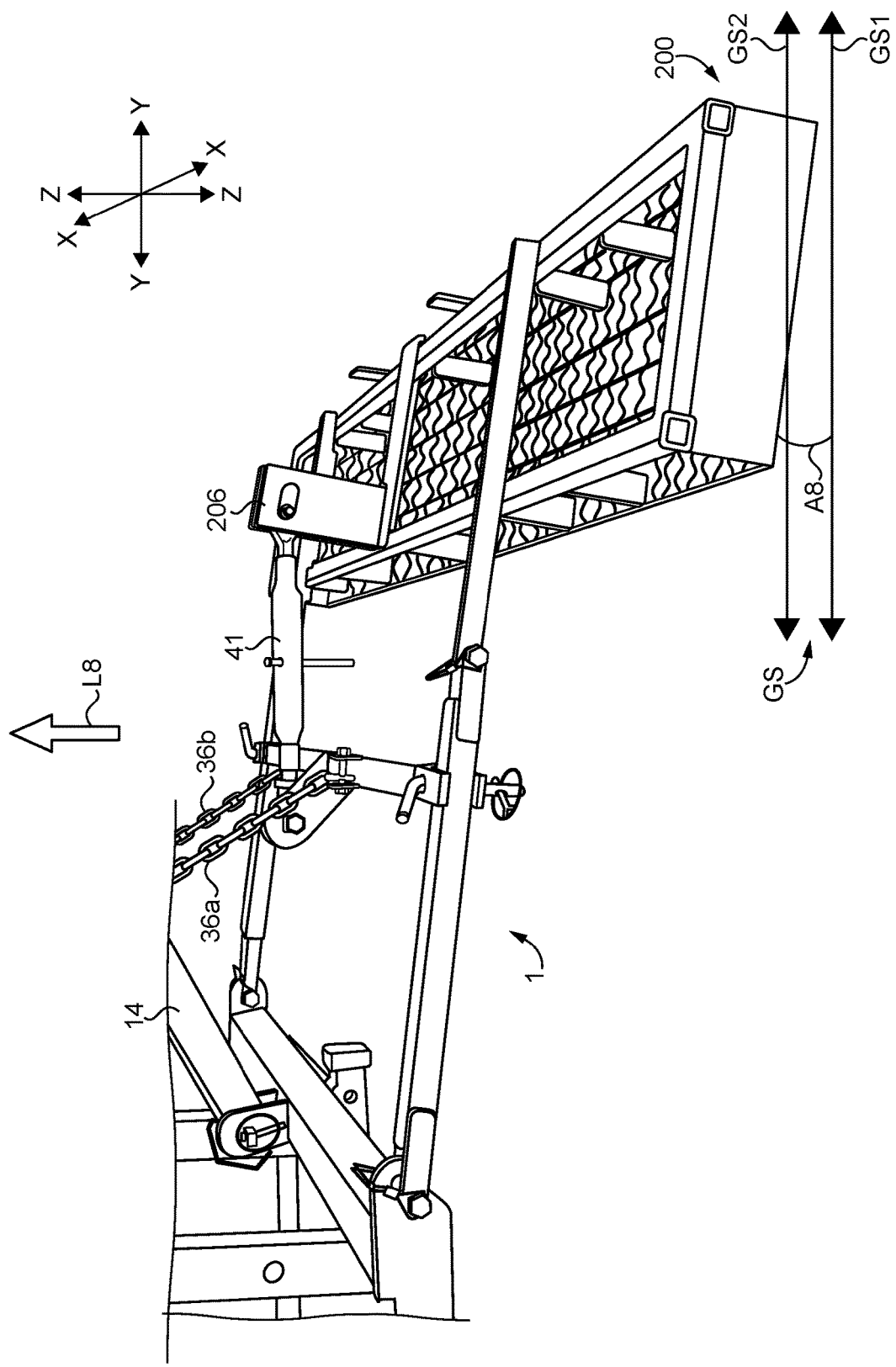

In the state of adjustment illustrated in FIG. 7, the actuator 120 has been adjusted to raise lifting member 14 such that flexible rigging members 36a and 36b are taut and surface conditioning tool 200 has been lifted in the direction indicated by arrow L7 to a non-parallel pitch relative to the ground surface GS as generally indicated by angle A7. Such lifting and rotation tends to increase the force applied to the rear of the surface conditioning tool 200 relative to the front surface of the surface conditioning tool 200 and also to reduce the net force as a portion of the weight of surface conditioning tool 200 is supported by articulating pitch-adjustable hitch 1 and the lifting force applied thereby. The degree of adjustment of actuator 120 and the resulting degree of lifting by lifting member 14 allow for control over the lifted pitch of surface conditioning tool 200. For example, in the state of adjustment illustrated in FIG. 8, the actuator 120 has been further adjusted to further raise lifting member 14 such that flexible rigging members 36a and 36b are taut and surface conditioning tool 200 has been further lifted in the direction indicated by arrow L8 to a greater magnitude non-parallel pitch relative to the ground surface GS as generally indicated by angle A8. The configuration illustrated in FIGS. 7 and 8 may be utilized to provide so-called "drive-off" grooming of certain ground surfaces by tapering down the surface material carrying volume of the work tool thereby allowing a controlled release of all material carried by the tool while mitigating or eliminating uneven deposition of surface material.

Figure 9:
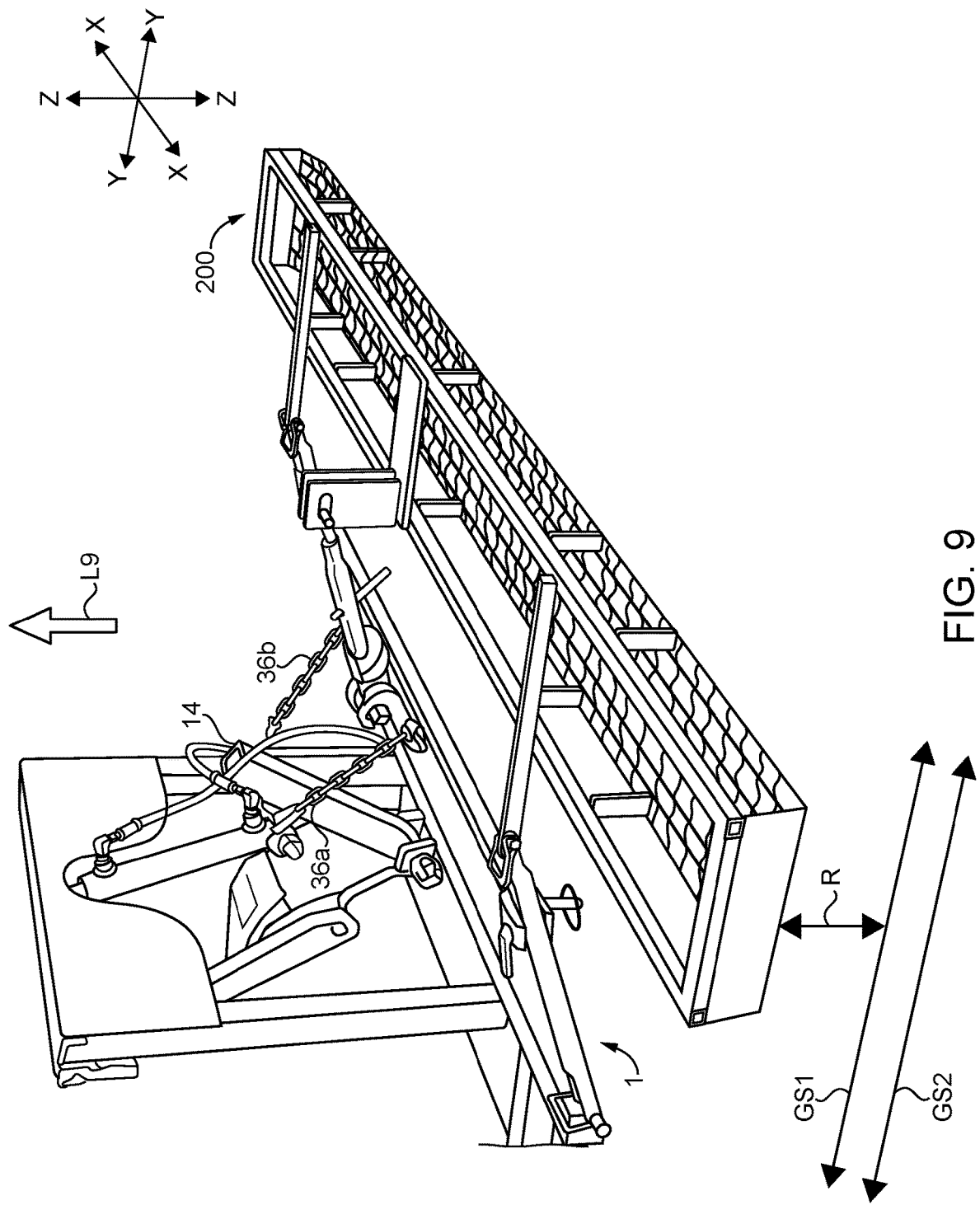

In the state of adjustment illustrated in FIG. 9, the actuator 120 has been adjusted to raise lifting member 14 such that flexible rigging members 36a and 36b are taut and surface conditioning tool 200 has been lifted in the direction indicated by arrow L9 to a position raised above the top layer GS1 of the underlying ground surface as generally indicated by arrow R. Raising the surface conditioning tool 200 to the illustrated position further provides lateral centering of the surface conditioning tool which may be preferred, for example, when the work machine travels through a gate or other opening.

Figure 10:
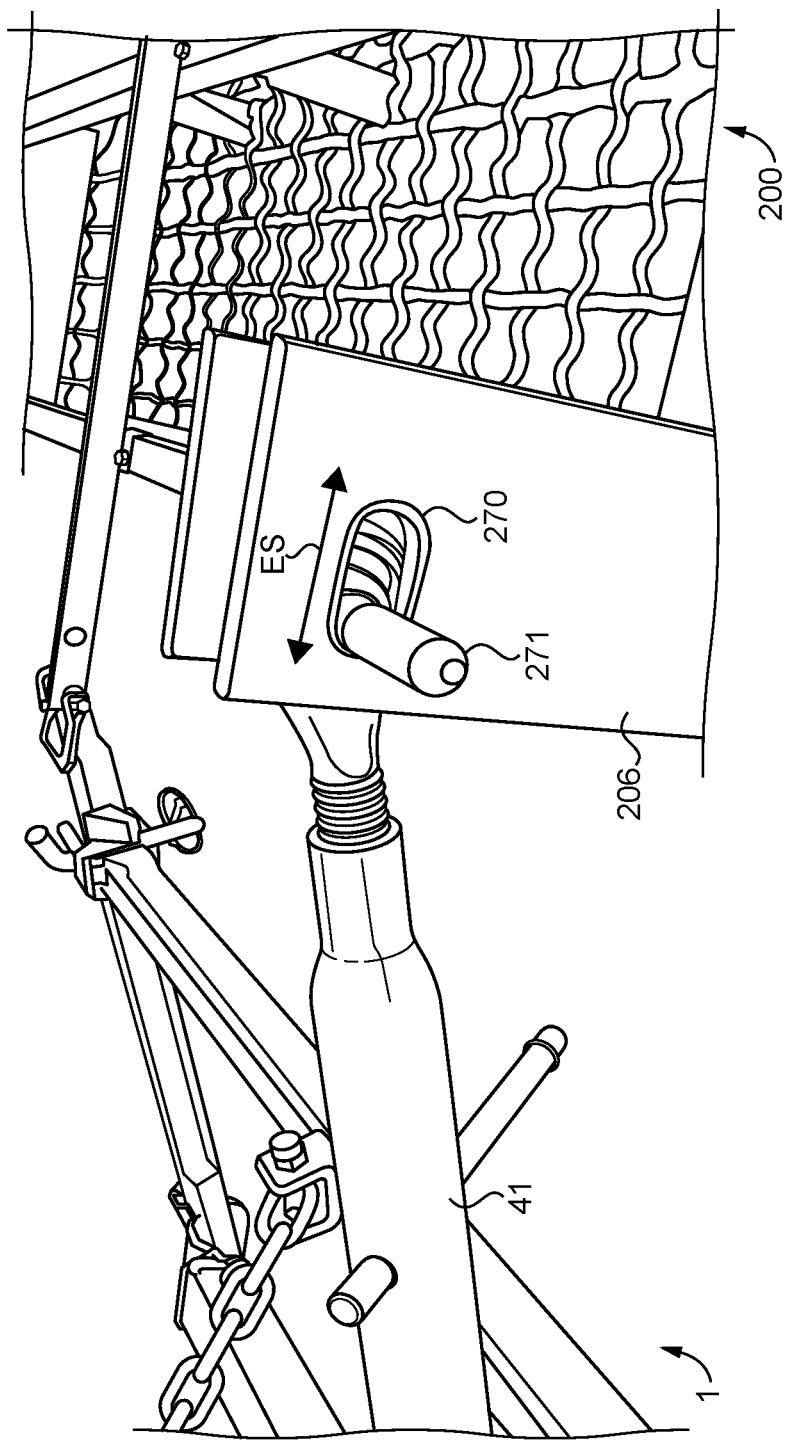
FIG. 10 depicts a perspective view of a portion of FIG. 9.

With reference to FIGS. 10-13, there are illustrated perspective views focusing on several portions of the exemplary articulating pitch-adjustable hitch of FIG. 1. FIG. 10 illustrates a perspective view of certain portions of articulating pitch-adjustable hitch 1 and surface conditioning tool 200 in the state of adjustment illustrated in FIG. 9. The view of FIG. 10 illustrates in further detail the coupling of top link 41 with tool joint member 206. In particular, it can be seen that pin 271 is disposed within slot 270 and may travel along the length of slot 270 in the direction generally indicated by arrow ES. Such motion may occur as a result of the adjustment of top link 41 or lifting member 14 as described above in connection with FIGS. 5-9.

Figure 12B:
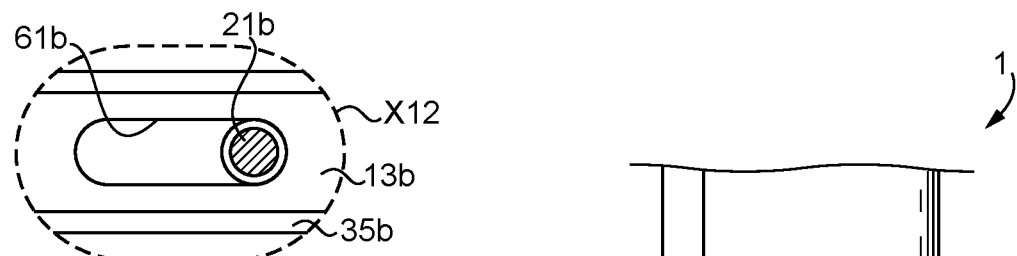
FIGS. 12*b* and 13*b* depict partial sectional views of region X12 of FIG. 12*a* and region X13 of 13*a*, respectively.
Figure 12A:
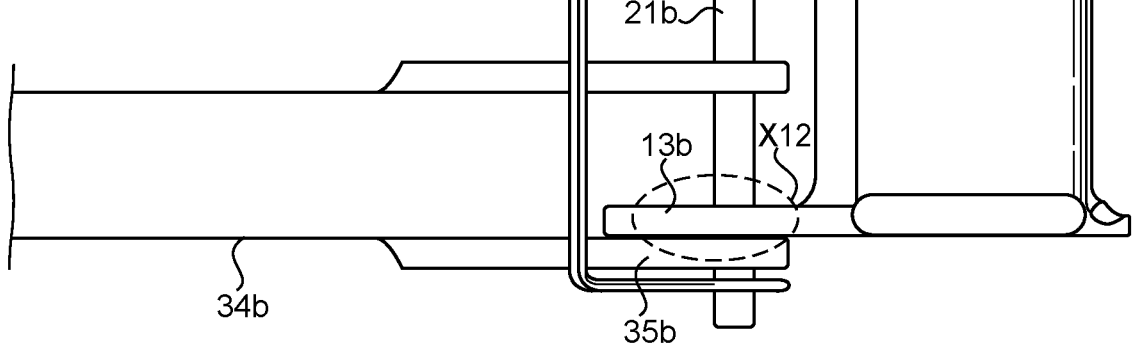
Figure 13B:
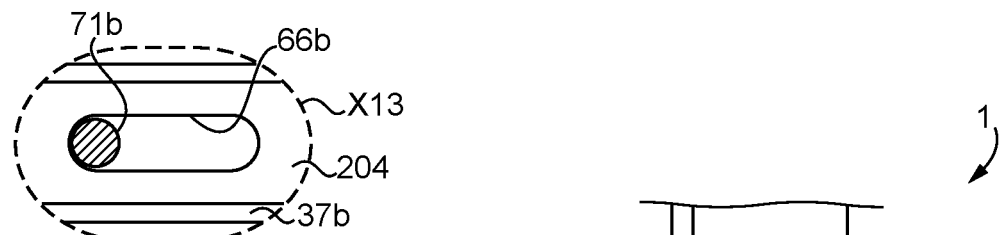
Figure 13A:
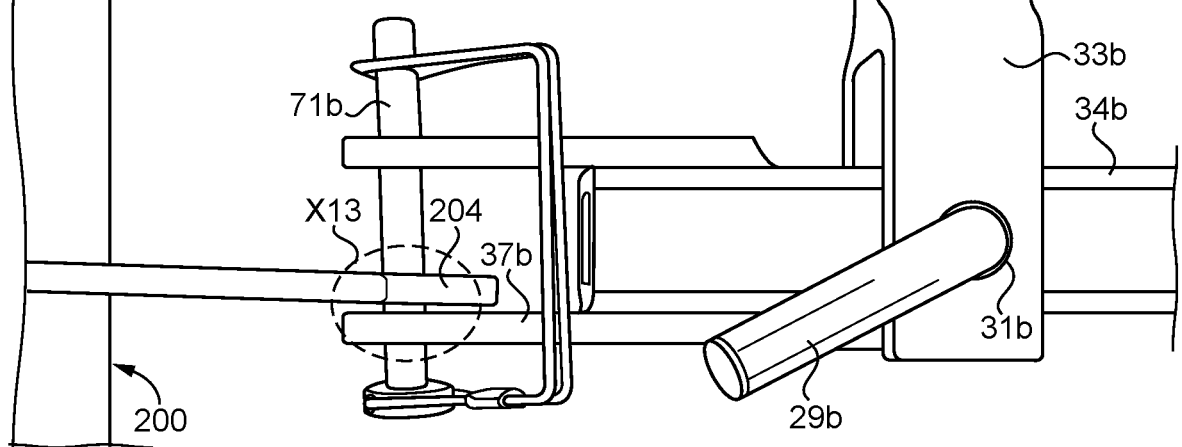

With reference to FIG. 12a, there is illustrated a partial sectional view of region X12 of FIG. 12. In particular, it can be seen that pin 21b is disposed within slot 61b and may travel along the length of slot 61b. Similarly, with reference to FIG. 13a there is illustrated a partial sectional view of region X13 of FIG. 13. In particular, it can be seen that pin 71b is disposed within slot 66b and may travel along the length of slot 66b.

Figure 14:
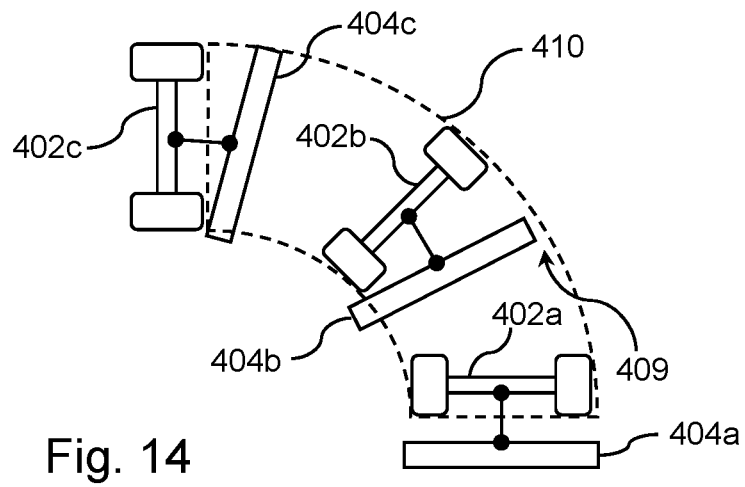
FIG. 14 depicts a top schematic view of a turning path of a work machine coupled with a work tool by a single point hitch.

With reference to FIG. 14, there is illustrated a top schematic view of a turning path of a work machine coupled with a work tool by a single point hitch. FIG. 14 shows the progression of the rear wheels of the work machine at various positions 402a, 404b and 402c along a turning path 410. FIG. 14 further shows the progression of the work tool coupled with the work machine by a single point hitch at various positions 404a, 404b and 404c relative to turning path 410. The work machine and the work tool may be of the types described herein.

The turning path 410 indicates the path traveled by the rear wheels of the work machine. As indicated by arrow 409, due to the location of the work tool at position 404b relative to the turning path 410, a portion of the turning path 410 will not be covered or traversed by the work tool. Consequently, tracks from the rear wheels will remain behind the work tool, requiring additional passes by the work tool. Of course, these passes themselves may leave further tracks, requiring even more effort and effectively constraining the useable turning radius of this combination of the work machine and the work tool.

Figure 15:
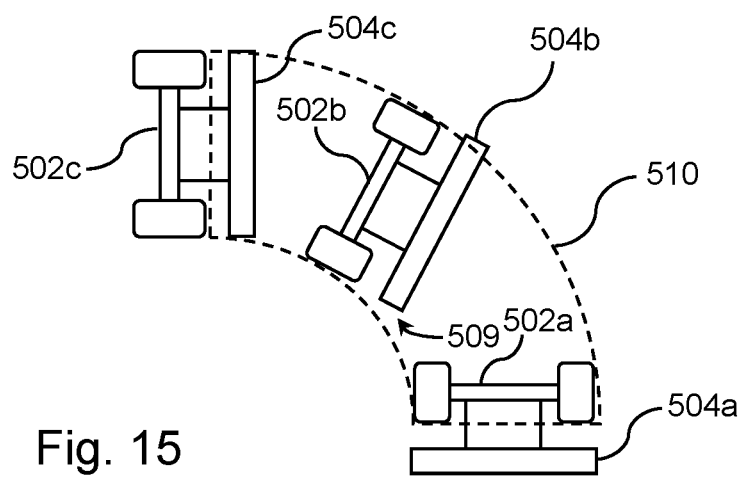
FIG. 15 depicts a top schematic view of a turning path of a work machine coupled with a work tool by a fixed or rigid hitch.

With reference to FIG. 15, there is illustrated a top schematic view of a turning path of a work machine coupled with a work tool by a fixed or rigid hitch. FIG. 15 shows the progression of the rear wheels of a work machine at various positions 502*a*, 502*b* and 502*c* of a turning path 510. FIG. 15 further shows the progression of a work tool coupled with the work machine by a fixed or rigid hitch at various positions 504*a*, 504*b* and 504*c* relative to turning path 510. The work machine and the work tool may be of the types described herein.

The turning path 510 indicates the path traveled by the rear wheels of the work machine. As indicated by arrow 509, due to the location of the work tool at position 504*b* relative to the turning path 510, a portion of the turning path 510 will not be covered or traversed by the work tool. Consequently, tracks from the rear wheels will remain behind the work tool, requiring additional passes by the work tool. Of course, these passes themselves may leave further tracks, requiring even more effort and effectively constraining the useable turning radius of this combination of the work machine and the work tool.

Figure 16:
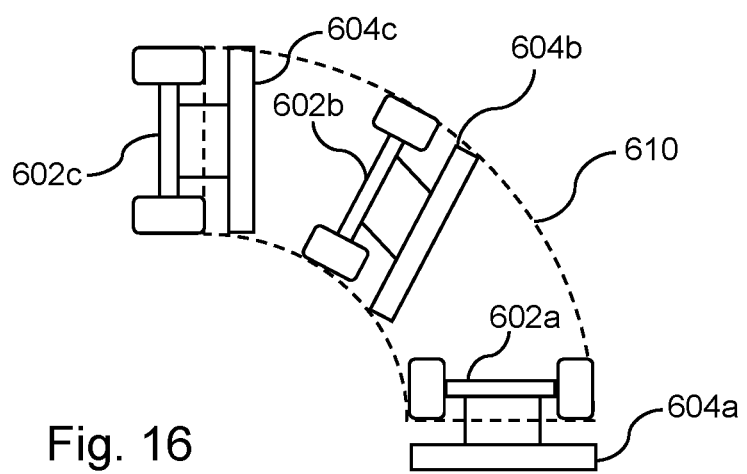
FIG. 16 depicts a top schematic view of a turning path of a work machine coupled with a work tool by an articulating hitch such as the exemplary articulating pitch-adjustable hitch of FIG. 1.

With reference to FIG. 16 there is illustrated a top schematic view of a turning path of a work machine coupled with a work tool by an articulating hitch, such as hitch 1 described herein. FIG. 16 shows the progression of the rear wheels of a work machine at various positions 602*a*, 602*b* and 602*c* of a turning path 610. FIG. 16 further shows the progression of a work tool coupled with the work machine by a single point hitch at various positions 604*a*, 604*b* and 604*c* relative to turning path 610. The work machine and the work tool may be of the types described herein.

The turning path 610 indicates the path traveled by the rear wheels of the work machine. As can be seen by comparing the location of the work tool at positions 404*a*, 404*b* and 404*c* relative to the turning path 410, the work tool traverses and covers the entirety of the turning path 410 due to articulation of the hitch such as described herein. Such articulation mitigates or eliminates the need for additional passes by the work tool and increases the useable turning radius of this combination of the work machine and the work tool, allowing tighter turns to be executed while still covering the tracks of the work machine with the work tool.

It shall be appreciated that the longitudinal length of the offset between the work machine and the work tool, the lateral width of the work tool and the degree of side-to-side articulation or sway may be selected to provide an increase in useable turning radius of the combination of the work machine and the work tool. For example, the longitudinal length of the offset between the work machine and the work tool may be selected to provide a sufficient clearance between the work machine and the work tool for a predetermined turning radius. The width of the work tool and the degree of side-to-side articulation or sway may then be selected to ensure that the work tool travels over and covers the tracks left by the work machine.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a hitch assembly including a forward lateral member, a rearward lateral member, a first longitudinal member, a second longitudinal member and a lifting member which are coupled together to form a laterally-articulating pitch-adjustable frame, wherein
the forward lateral member is coupled with the first longitudinal member by a first joint and is coupled with the second longitudinal member by a second joint,
the rearward lateral member is coupled with the first longitudinal member by a third joint and is coupled with the second longitudinal member by a fourth joint,
the lifting member is coupled with the rearward lateral member by a first flexible rigging member and a second flexible rigging member,
the laterally-articulating pitch-adjustable frame is moveable between a first position in which the frame is left-leaning and a second position in which the frame is right-leaning, and
the lifting member is adjustable over a first range to vary an amount of slack in at least one of the first flexible rigging member and the second flexible rigging member and over a second range to raise and lower the rearward lateral member.

2. The apparatus of claim 1 wherein the first joint and the second joint comprise play-added clevis joints.

3. The apparatus of claim 1 wherein the third joint and the fourth joint comprise revolute joints.

4. The apparatus of claim 1 wherein the lifting member is coupled with the forward lateral member by a fifth joint.

5. The apparatus of claim 1 wherein a first tool coupling, a second tool coupling, and a third tool coupling extend from the frame at a rearward location.

6. The apparatus of claim 5 wherein the first tool coupling extends from the first longitudinal member, the second tool coupling extends from the second longitudinal member, and the third tool coupling extends from the rearward lateral member.

7. The apparatus of claim 1 further comprising a self-propelled work machine, wherein the hitch assembly is coupled with the self-propelled work machine.

8. The apparatus of claim 1 further comprising a surfacing conditioning tool, wherein the hitch assembly is coupled with the surfacing conditioning tool.

9. The apparatus of claim 8 wherein the surfacing conditioning tool is coupled with the rearward lateral member by a length-adjustable coupling member.

10. The apparatus of claim 8 wherein the surfacing conditioning tool comprises a grooming drag.

11. A system comprising: a hitch assembly including a forward lateral member, a rearward lateral member, a first longitudinal member and a second longitudinal member which are coupled together at a plurality of joints to form a laterally-articulating pitch-adjustable frame, and a lifting member coupled with the rearward lateral member by a first flexible rigging member and a second flexible rigging member, wherein the laterally-articulating pitch-adjustable frame is moveable between a first position in which the frame is left-leaning, a second position in which the frame is rectangular and a third position in which the frame is right-leaning, and the lifting member is adjustable over a first range to vary an amount of slack in at least one of the first flexible rigging member and the second flexible rigging member and over a second range to raise and lower the rearward lateral member.

12. The system of claim 11 comprising a surface conditioning tool coupled with the hitch assembly at a first tool coupling, a second tool coupling, and a third tool coupling.

13. The system of claim 12 wherein the first tool coupling and the second tool coupling comprise play-added clevis joints.

14. The system of claim 12 wherein the third tool coupling comprises a length-adjustable coupling member.

15. The system of claim 14 wherein the length-adjustable coupling member comprises a top link.

16. The system of claim 11 wherein the forward lateral member is coupled with the first longitudinal member by a first play-added clevis-type joint and is coupled with the second longitudinal member by a second play-added clevis-type joint.

17. A hitch assembly comprising:
a frame including a plurality of joints providing lateral articulation and pitch adjustability of the frame;
a lifting member coupled with the frame at a first location by a first flexible rigging member, coupled with the frame at a second location by a second flexible rigging member, and rotatably coupled with the frame at a third location; and
a plurality of tool coupling joint members coupled with the frame;
wherein the pitch of the frame is variable by rotation of the lifting member relative to the frame, over a first range of pitch adjustment the frame is concurrently moveable between a left-leaning position in which the first flexible rigging member is slack and the second flexible rigging member is taut, and a right-leaning position in which the first flexible rigging member is taut and the second flexible rigging member is slack, and over a second, and over a second range of pitch adjustment the frame is maintained in a central position in which the first flexible rigging member is taut and the second flexible rigging member is taut.

18. The hitch assembly of claim 17 comprising a surface conditioning tool coupled with the plurality of tool coupling joint members.

19. The hitch assembly of claim 18 which the pitch of the surface conditioning is variable concurrently with and independently from variation in the pitch of the frame by varying a length of a length-variable one of the plurality of coupling joint members.

20. The hitch assembly of claim 19 wherein the length-variable one of the plurality of coupling joint members comprises a top link.

* * * * *